United States Patent
Milton, Jr. et al.

(10) Patent No.: US 8,612,853 B2
(45) Date of Patent: Dec. 17, 2013

(54) SYSTEM FOR AUTOMATICALLY INSERTING REFERENCE NUMERALS IN A PATENT APPLICATION

(75) Inventors: Harold W. Milton, Jr., Bloomfield Hills, MI (US); Jacob Allen, Columbiaville, MI (US)

(73) Assignee: Harold W. Milton, Jr., Bloomfield Hills, MI (US)

( * ) Notice: Subject to any disclaimer, the term of this patent is extended or adjusted under 35 U.S.C. 154(b) by 1129 days.

(21) Appl. No.: 11/940,618

(22) Filed: Nov. 15, 2007

(65) Prior Publication Data

US 2009/0132899 A1   May 21, 2009

(51) Int. Cl.
*G06F 17/22* (2006.01)

(52) U.S. Cl.
USPC .......................................... 715/255; 715/254

(58) Field of Classification Search
USPC ................................. 715/255, 254
See application file for complete search history.

(56) References Cited

U.S. PATENT DOCUMENTS

| | | |
|---|---|---|
| 5,175,681 A | 12/1992 | Iwai et al. |
| 5,623,681 A | 4/1997 | Rivette et al. |
| 5,754,840 A | 5/1998 | Rivette et al. |
| 5,774,833 A | 6/1998 | Newman |
| 5,875,448 A | 2/1999 | Boys et al. |
| 6,029,182 A | 2/2000 | Nehab et al. |
| 6,049,811 A | 4/2000 | Petruzzi et al. |
| 6,239,802 B1 | 5/2001 | Lahey et al. |
| 6,298,327 B1 | 10/2001 | Hunter et al. |
| 6,434,580 B1 | 8/2002 | Takano et al. |
| 7,346,511 B2 * | 3/2008 | Privault et al. ............. 704/255 |
| 7,552,051 B2 * | 6/2009 | Privault et al. ............. 704/255 |
| 2002/0077832 A1 | 6/2002 | Leonid et al. .............. 704/276 |
| 2004/0107088 A1 * | 6/2004 | Budzinski ................... 704/10 |
| 2004/0117184 A1 * | 6/2004 | Privault et al. ............. 704/251 |
| 2004/0128122 A1 * | 7/2004 | Privault et al. .............. 704/4 |
| 2004/0148248 A1 * | 7/2004 | Allen et al. ................ 705/37 |
| 2005/0005239 A1 * | 1/2005 | Richards .................... 715/530 |
| 2006/0059413 A1 * | 3/2006 | Tran .......................... 715/500 |
| 2007/0050385 A1 * | 3/2007 | Young et al. ............... 707/100 |
| 2007/0136321 A1 * | 6/2007 | Allen et al. ................. 707/100 |

OTHER PUBLICATIONS

Hal Milton and Jacob Allen. "Patent Architecture—Tutorial." (no date available).*
Hal Milton and Jacob Allen. "Patent Architecture—User's Manual." (no date available).*

* cited by examiner

*Primary Examiner* — Doug Hutton, Jr.
*Assistant Examiner* — Soumya Dasgupta
(74) *Attorney, Agent, or Firm* — Dickinson Wright PLLC (57) ABSTRACT

A system for preparing a patent application in conjunction with a word processing program. The patent application includes elements, each having a common noun and being differentiated by a different adjective or combination of adjectives. The computer program automatically inserts the proper reference numeral or reference numerals following each occurrence of the common noun throughout the patent application.

9 Claims, 8 Drawing Sheets

SYSTEM FOR AUTOMATICALLY INSERTING REFERENCE NUMERALS IN A PATENT APPLICATION

CROSS REFERENCE TO RELATED APPLICATION

This application claims priority of U.S. Provisional Application No. 60/846,326, filed Sep. 21, 2006. This application is directed to the same field of invention as application Ser. No. 09/273,021 filed Mar. 19, 1999 and application Ser. No. 11/300,207 filed Dec. 14, 2005.

BACKGROUND OF THE INVENTION

1. Field of the Invention

A method of preparing a patent application in conjunction with a word processing program.

2. Description of the Prior Art

The method of preparing a patent application disclosed in the aforementioned U.S. patent application includes the step of searching the computer program for each occurrence of each respective element name and replacing it with the same element name followed by successive even numbers ascending in the order of first appearance of the element name. This invention is a further perfection of the steps set forth in the aforementioned method.

A less pertinent method of preparing a patent application is disclosed in U.S. Pat. No. 6,049,811 issued to Petruzzi et al. on Apr. 11, 2000. The '811 patent discloses a method of drafting application using a computer program where the user identifies primary elements to be included in a Primary Element List.

SUMMARY OF THE INVENTION AND ADVANTAGES

The invention provides a method for preparing a patent application having a description section and a claims section and an abstract section by using a computer program. The patent application includes a first element having a common noun modified by a first primary adjective and a second element having the common noun modified by a second primary adjective. The first element is associated with a first reference numeral and the second element is associated with a second reference numeral. The method is characterized by automatically inserting first and second reference numerals following the common noun in response to each recitation of the common noun unmodified by an adjective to reference the first and second elements.

The invention also provides system including a computer and a computer program for preparing a patent application in conjunction with a word processing program. The system includes a memory for storing a first element having a common noun modified by a first primary adjective and a first reference numeral and a memory for storing a second element having the common noun modified by a second primary adjective and a second reference numeral. The system is characterized by a common noun processor for automatically inserting the first and second reference numerals following the common noun in response to a scanning processor detecting the common noun unmodified by an adjective.

The invention brings order to the preparation of a patent application and increases efficiency in the preparation of patent applications by automatically recognizing combinations of elements when only a single common noun is recited in a patent application. It automates part of the preparation of patent applications, but more importantly, it prevents mistakes by ensuring that each element throughout the patent application is properly referenced.

BRIEF DESCRIPTION OF THE DRAWINGS

Other advantages of the present invention will be readily appreciated, as the same becomes better understood by reference to the following detailed description when considered in connection with the accompanying drawing wherein.

DETAILED DESCRIPTION OF THE INVENTION

Referring to the Figures, wherein like numerals indicate corresponding parts throughout the several views, a method of preparing a patent application in conjunction with a computer program is shown in the flow charts indicating the steps used to automatically insert reference numerals to identify elements in the drawings of a patent application having a claims section, a description section, and an abstract section.

Figure 1A:
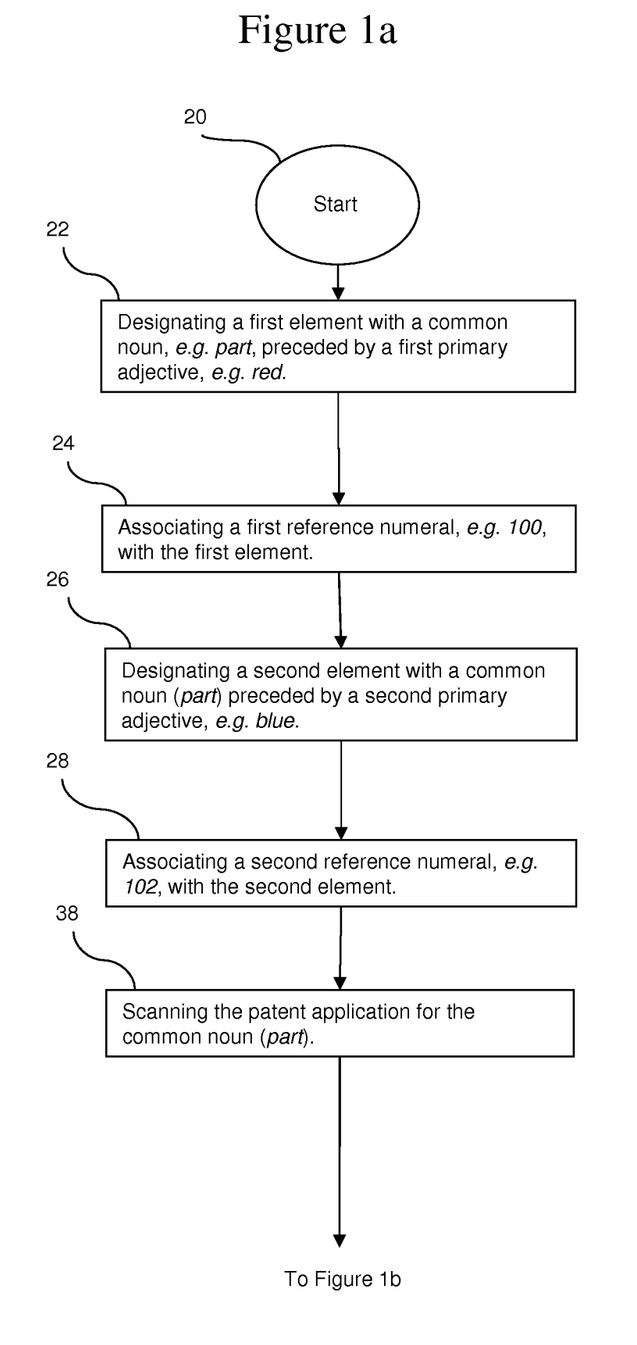
FIGS. 1a and 1b are a flow chart of a first embodiment of the invention.
Figure 1B:
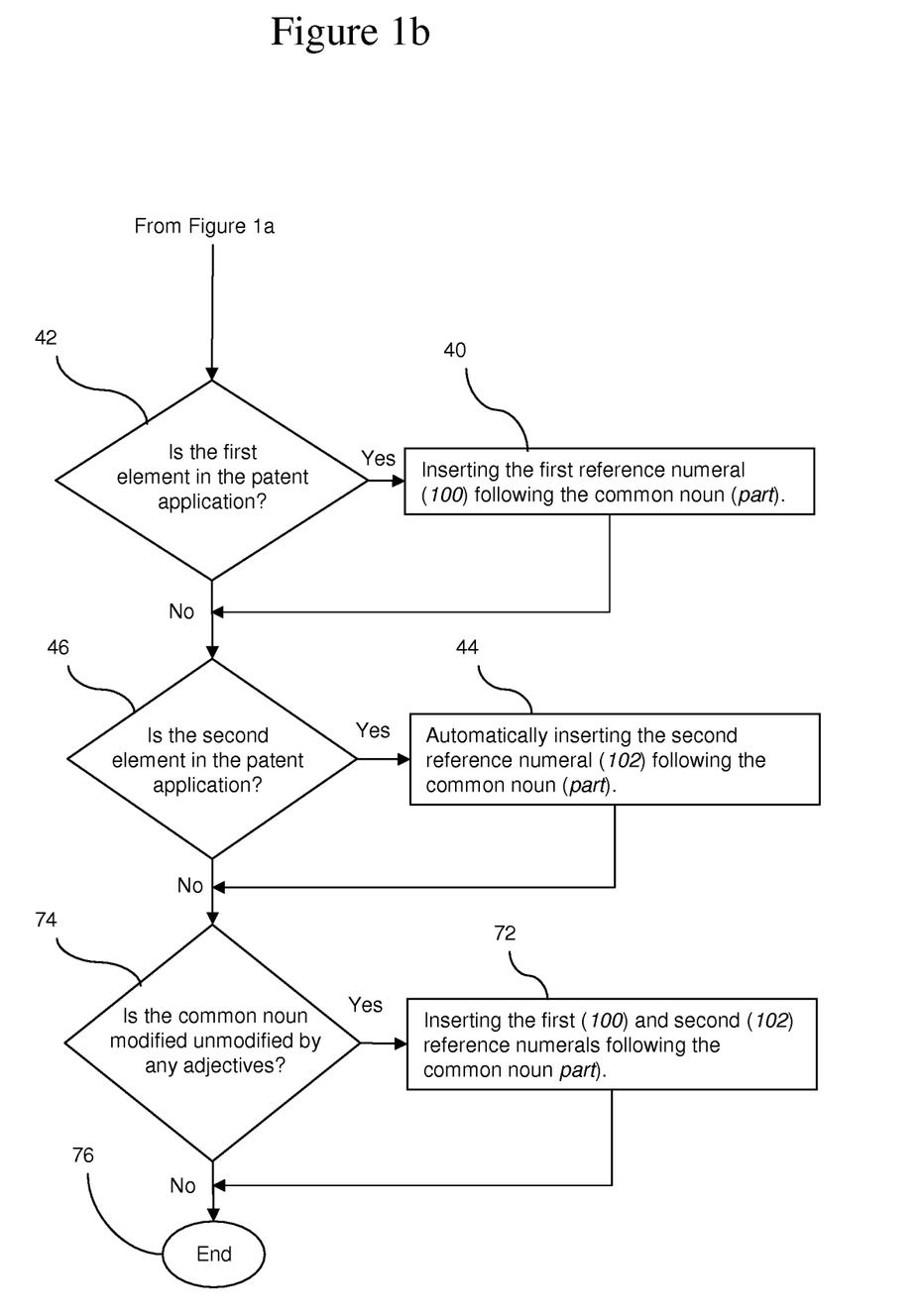

The invention provides a method of preparing a patent application having a description section and a claims section and an abstract section by using a computer program and a word processing program. A first embodiment of the invention, shown in FIG. 1, starts 20 with the step of designating 22 a first element with a common noun, e.g. part, preceded solely by a first primary adjective, e.g. red, and associating 24 a first reference numeral, e.g. 100, with the common noun (part) preceded by the first primary adjective (red).

The method continues with the step of designating 26 a second element with the common noun (part) preceded solely by a second primary adjective, e.g. blue, and associating 28 a second reference numeral, e.g. 102, with the common noun (part) preceded by the second primary adjective (blue).

The method proceeds by scanning 38 the claims section and the description section and the abstract section for each occurrence of the common noun (part). The method continues by inserting 40 the first reference numeral (100) following the common noun (part) in response to each recitation of the common noun (part) preceded solely by the first primary adjective (red) 42 and inserting 44 the second reference numeral (102) following the common noun (part) in response to each recitation of the common noun (part) preceded solely by the second primary adjective (blue) 46.

The first embodiment is characterized by automatically inserting 72 the first (100) and second (102) reference numerals following the common noun (part) in response to each recitation of the common noun (part) unmodified by an adjective 74 throughout the claims section and the description section and the abstract section of the patent application. Upon inserting the proper reference numerals following each recitation of the common noun (part), the method ends 76.

Figure 2A:
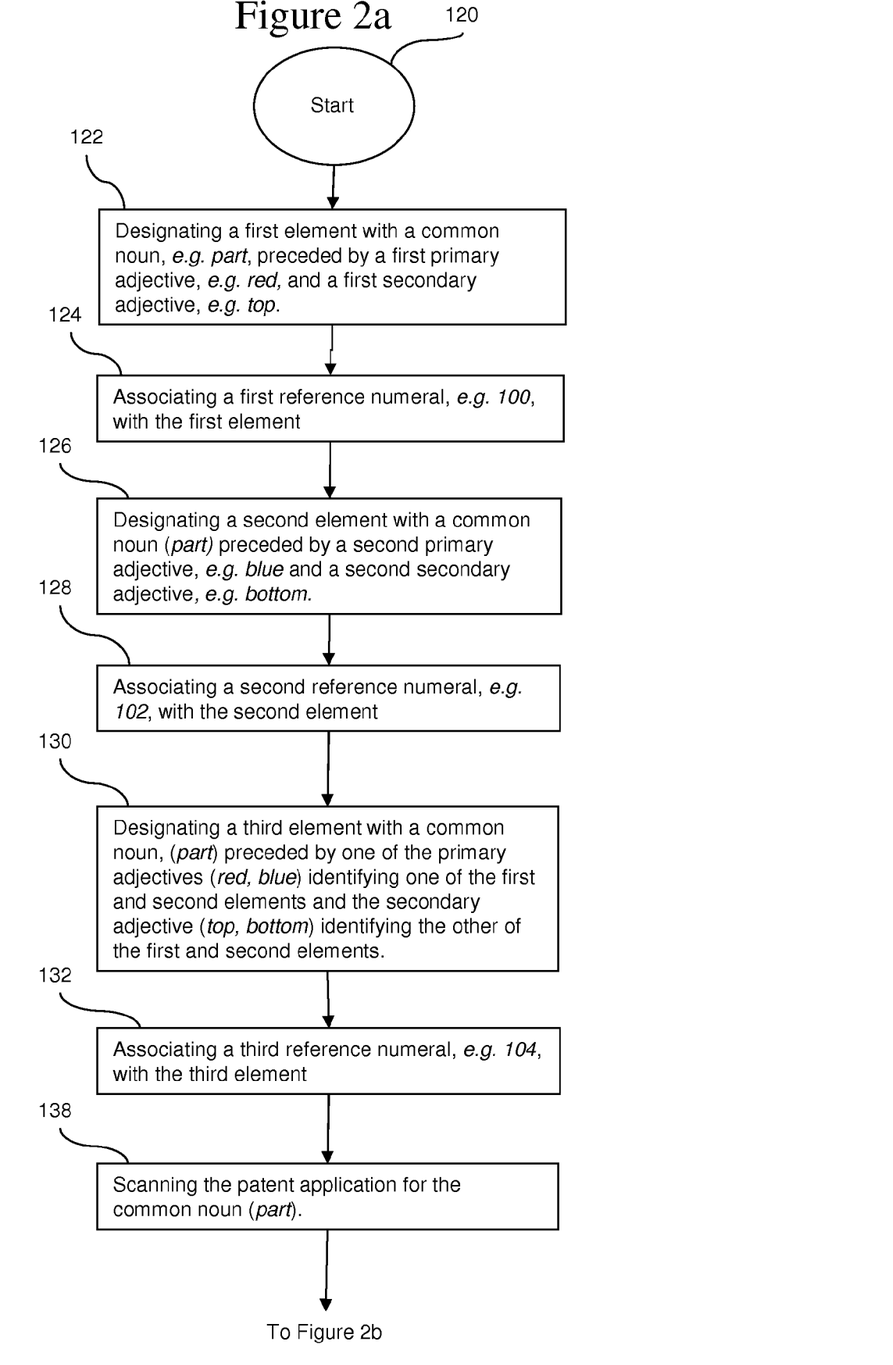
FIGS. 2a, 2b and 2c are a flow chart of a second embodiment of the invention.
Figure 2B:
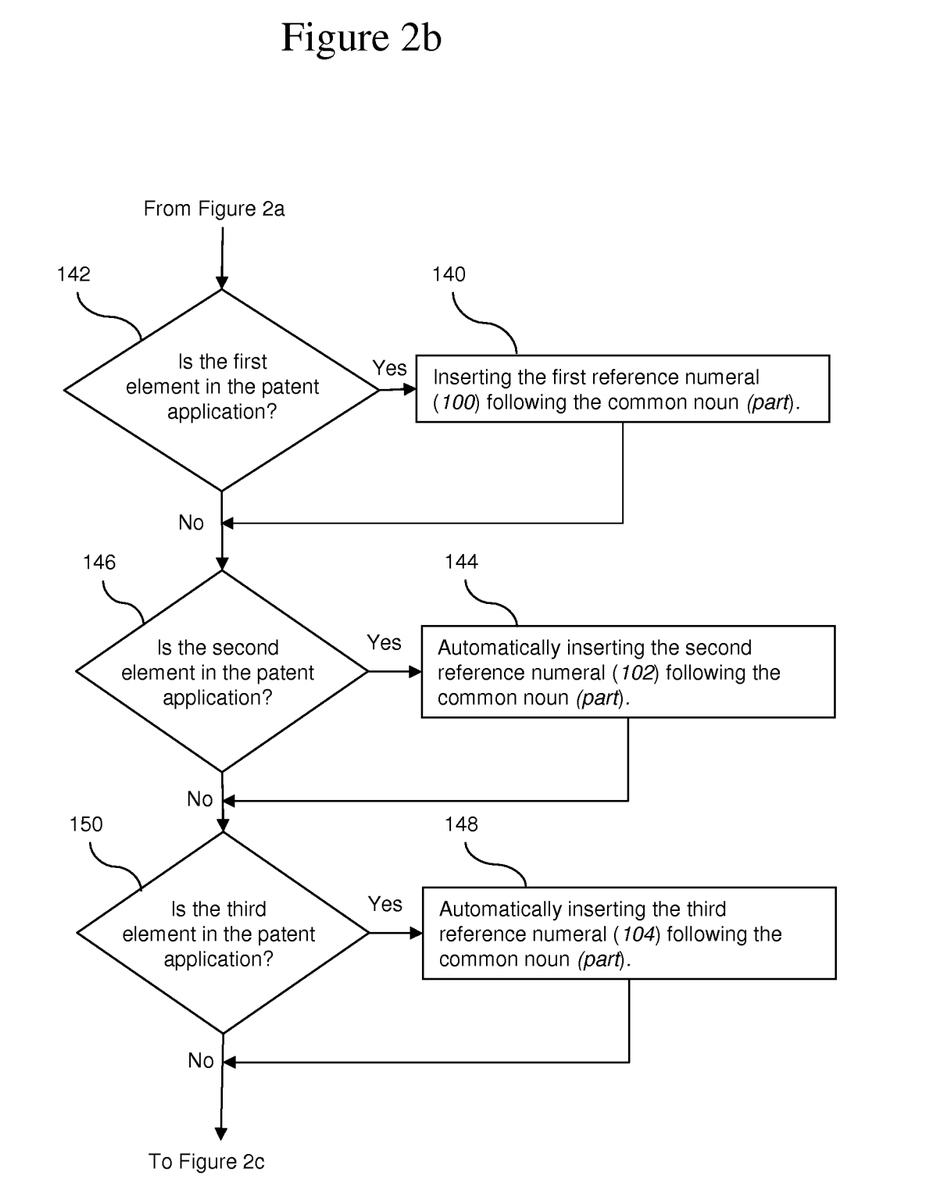
Figure 2C:
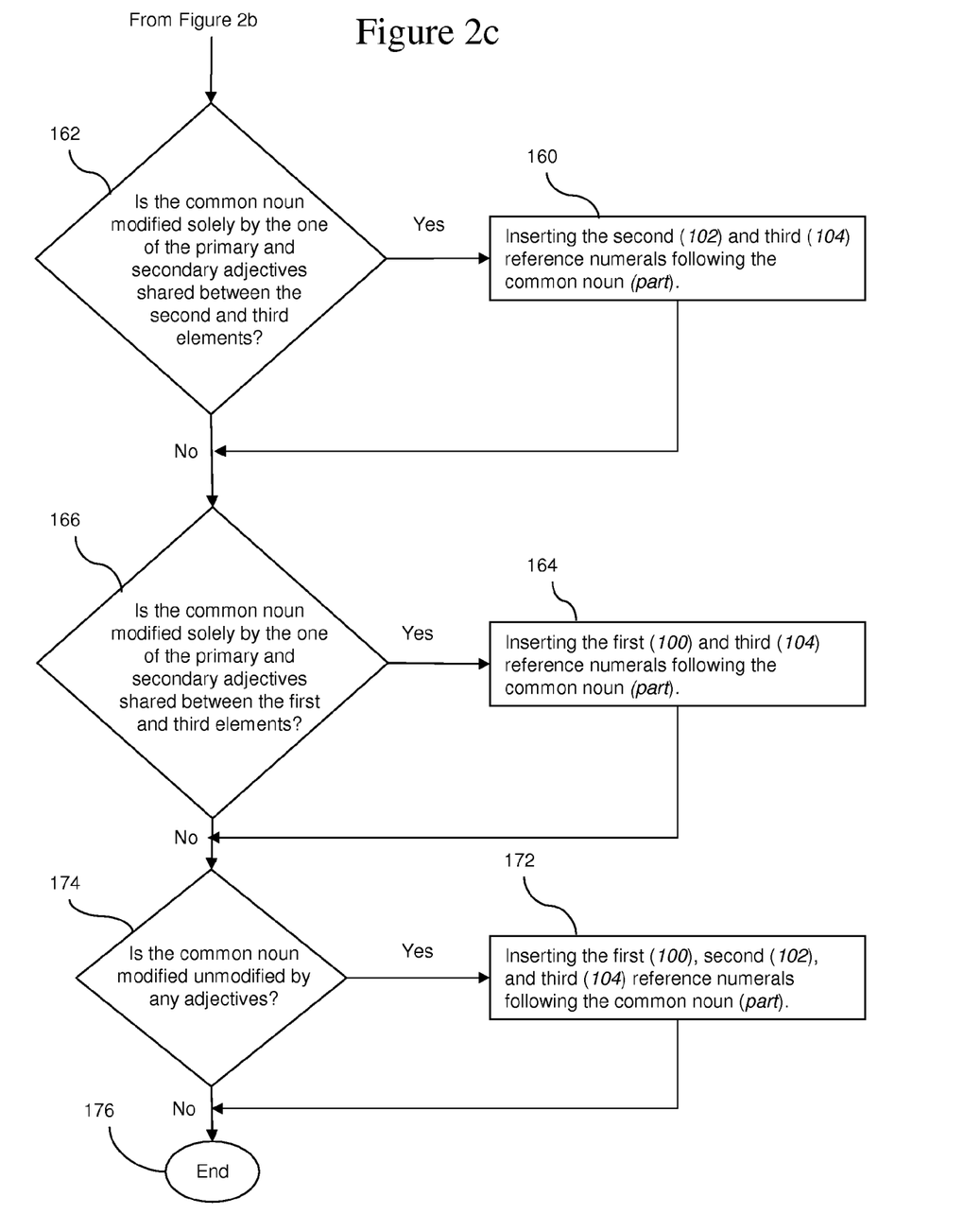

The second embodiment, shown in FIG. 2, starts 120 with the step of designating 122 a first element with a common noun (part) preceded by a first primary adjective (red) and a first secondary adjective, e.g. top, and associating 124 a first reference numeral (100), with the common noun (part) preceded by the first primary adjective (red) and the first secondary adjective (top) to reference the first element, e.g. top red part 100.

The method continues by designating 126 a second element with the common noun (part) preceded by a second primary adjective (blue) and a second secondary adjective, e.g. bottom, and associating 128 a second reference numeral (102) with the common noun (part) preceded by the second primary adjective (blue) and the second secondary adjective (bottom) to reference the second element, e.g. bottom blue part 102.

The method further includes the step of designating 130 a third element with the common noun (part) preceded by a third combination of adjectives including one of the primary adjectives (red, blue) identifying one of the first and second elements combined with the secondary adjective (top, bottom) identifying the other one of the first and second elements and associating 132 a third reference numeral (104) with the third element.

The method proceeds by scanning 138 the claims section and the description section and the abstract section for each occurrence of the common noun (part) for the purpose of inserting the proper reference numeral(s) following each occurrence of the common noun. The method continues by automatically inserting 140 the first reference numeral (100) following the common noun (part) in response to each recitation of the common noun (part) preceded by the first primary adjective (red) and the first secondary adjective (top) throughout the claims section and the description section and the abstract section of the patent application to reference the first element (top red part) 142.

The method continues by automatically inserting 144 the second reference numeral (102) following the common noun (part) in response to each recitation of the common noun (part) preceded by the second primary adjective (blue) and the second secondary adjective (bottom) throughout the claims section and the description section and the abstract section of the patent application to reference the second element (bottom blue part) 146.

The method proceeds by automatically inserting 148 the third reference numeral (104) following the common noun (part) in response to each recitation of the common noun (part) preceded by the third combination of adjectives including one of the primary adjectives (red, blue) identifying one of the first and second elements combined with the secondary adjective (top, bottom) identifying the other of the first and second elements 150.

The second embodiment is characterized by the step of automatically inserting 160 the second (102) and third (104) reference numerals following the common noun (part) in response to each recitation of the common noun (part) modified solely by the one of the primary (red, blue) and secondary (top, blue) adjectives shared between the second and third elements 162, and automatically inserting 164 the first (100) and third (104) reference numerals following the common noun (part) in response to each recitation of the common noun (part) modified solely by the one of the primary (red, blue) and secondary (top, bottom) adjectives shared between the first and third elements 166.

The second embodiment continues with the step of automatically inserting 172 the first (100), second (102), and third (104) reference numerals following the common noun (part) in response to each recitation of the common noun (part) unmodified by an adjective 174 throughout the claims section and the description section and the abstract section of the patent application. Upon inserting the proper reference numerals following each recitation of the common noun (part), the method ends 176.

Figure 3A:
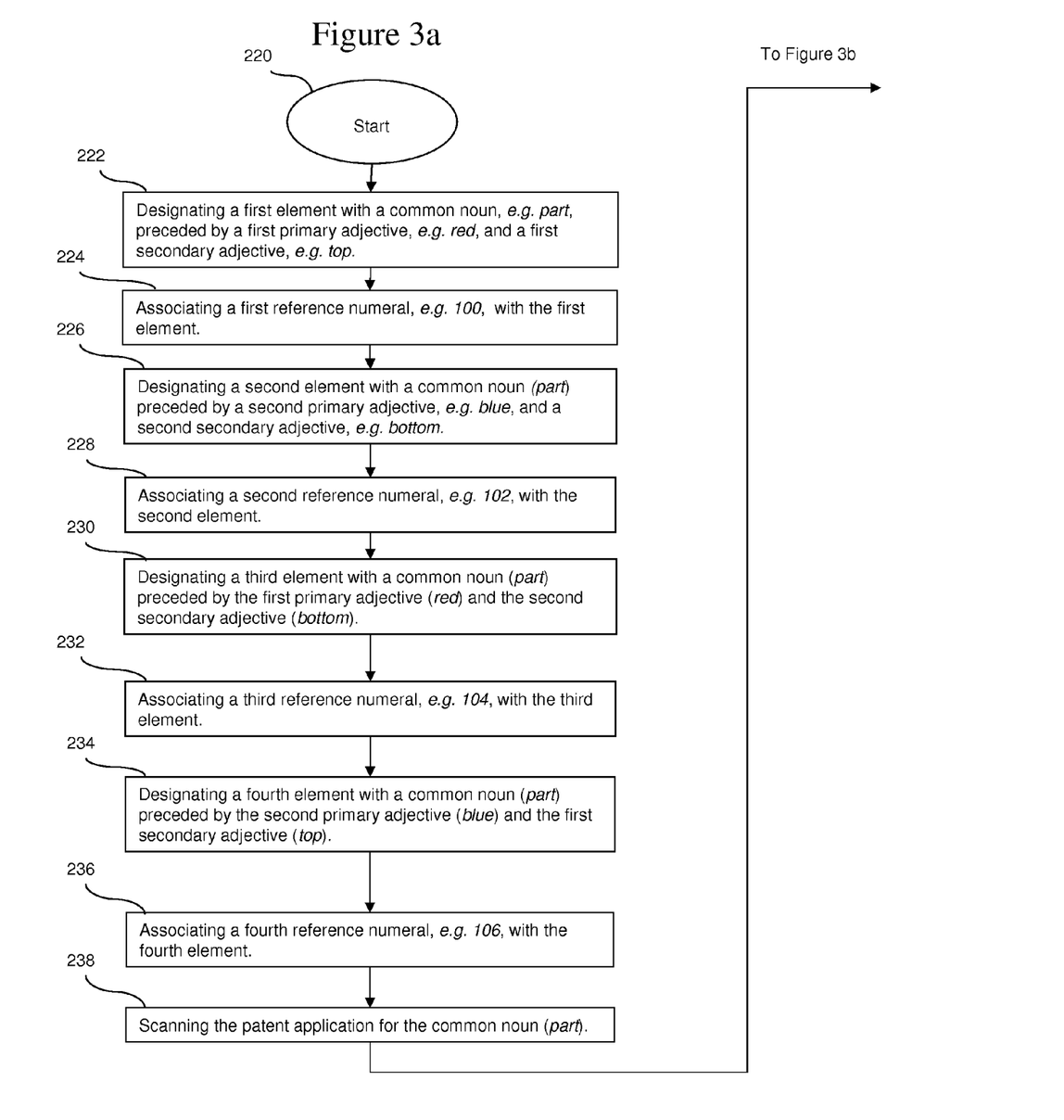
FIGS. 3a, 3b and 3c are a flow chart of a third embodiment of the invention.
Figure 3B:
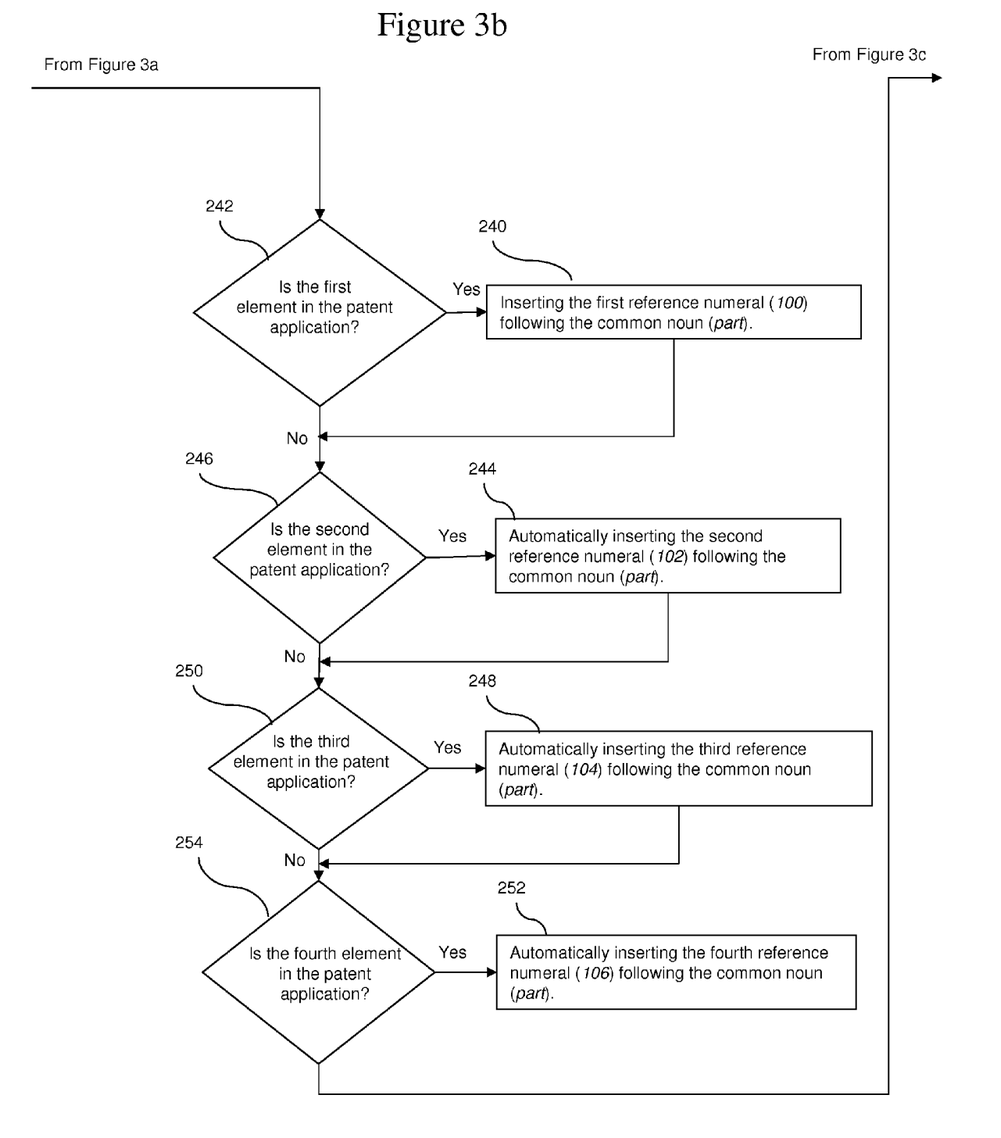
Figure 3C:
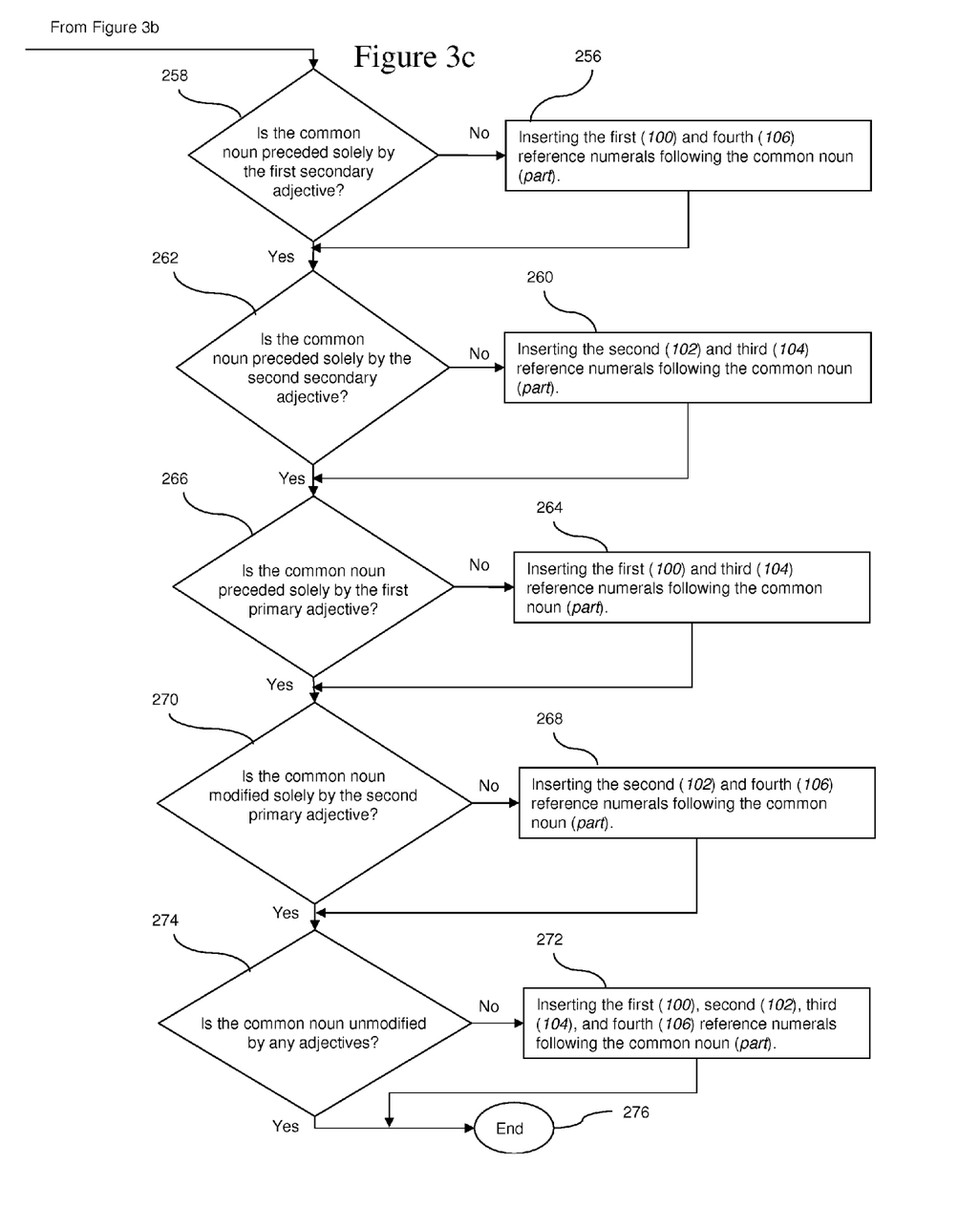

The third embodiment, shown in FIG. 3, starts 220 with the step of designating 222 a first element with a common noun (part) preceded by a first primary adjective (red) and a first secondary adjective (top) and associating 224 a first reference numeral (100), with the common noun (part) preceded by the first primary adjective (red) and the first secondary adjective (top) to reference the first element, e.g. top red part 100.

The method continues by designating 226 a second element with the common noun (part) preceded by a second primary adjective (blue) and a second secondary adjective (bottom) and associating 228 a second reference numeral (102) with the common noun (part) preceded by the second primary adjective (blue) and the second secondary adjective (bottom) to reference the second element, e.g. bottom blue part 102.

The method continues by designating 230 a third element with the common noun (part) preceded by the first primary adjective (red) and the second secondary adjective (bottom) and associating 232 a third reference numeral (104) with the common noun (part) preceded by the first primary adjective (red) and the second secondary adjective (bottom) to reference the third element, e.g. bottom red part 104.

The method continues by designating 234 a fourth element with the common noun (part) preceded by the second primary adjective (blue) and the first secondary adjective (top) and associating 236 a fourth reference numeral, e.g. 106, with the common noun (part) preceded by the second primary adjective (blue) and the first secondary adjective (top) to reference the fourth element, e.g. top blue part 106.

The method proceeds by scanning 238 the claims section and the description section and the abstract section for each occurrence of the common noun (part). The method continues by automatically inserting 240 the first reference numeral (100) following the common noun (part) in response to each recitation of the common noun (part) preceded by the first primary adjective (red) and the first secondary adjective (top) throughout the claims section and the description section and the abstract section of the patent application to reference the first element (top red part) 242.

The method continues by automatically inserting 244 the second reference numeral (102) following the common noun (part) in response to each recitation of the common noun (part) preceded by the second primary adjective (blue) and the second secondary adjective (bottom) throughout the claims section and the description section and the abstract section of the patent application to reference the second element (bottom blue part) 246.

The method continues by automatically inserting 248 the third reference numeral (104) following the common noun (part) in response to each recitation of the common noun (part) preceded by the first primary adjective (red) and the second secondary adjective (bottom) throughout the claims section and the description section and the abstract section of the patent application to reference the third element (bottom red part) 250.

The method continues by automatically inserting 252 the fourth reference numeral (106) following the common noun (part) in response to each recitation of the common noun (part) preceded by the second primary adjective (blue) and the first secondary adjective (top) throughout the claims section and the description section and the abstract section of the patent application to reference the fourth element (top blue part) 254.

The fourth embodiment is characterized by inserting multiple reference numerals following the common noun (part) where the common noun (part) is preceded by a single modifying adjective or is unmodified by an adjective. The method continues by automatically inserting 256 the first (100) and fourth (106) reference numerals following the common noun (part) in response to each recitation of the common noun (part) modified solely by the first secondary adjective (top) 258 throughout the claims section and the description section and the abstract section of the patent application to reference the first (top red part) and fourth (top blue part) elements.

The method continues by automatically inserting 260 the second (102) and third (104) reference numerals following the common noun (part) in response to each recitation of the common noun (part) modified solely by the second secondary adjective (bottom) 262 throughout the claims section and the description section and the abstract section of the patent application to reference the second (bottom blue part) and third (bottom red part) elements.

The method continues by automatically inserting 264 the first (100) and third (104) reference numerals following the common noun (part) in response to each recitation of the common noun (part) modified solely by the first primary adjective (red) 266 throughout the claims section and the description section and the abstract section of the patent application to reference the first (top red part) and third (bottom red part) elements.

The method continues by automatically inserting 268 the second (102) and fourth (106) reference numerals following the common noun (part) in response to each recitation of the common noun (part) modified solely by the second primary adjective (blue) 270 throughout the claims section and the description section and the abstract section of the patent application to reference the second (bottom blue part) and fourth (top blue part) elements.

The method further proceeds by automatically inserting 272 the first (100), second (102), third (104), and fourth (106) reference numerals following the common noun (part) in response to each recitation of the common noun (part) unmodified by an adjective 274 throughout the claims section and the description section and the abstract section of the patent application to reference the first (top red part), second (bottom blue part), third (bottom red part), and fourth (top blue part) elements. Upon inserting the proper reference numerals following each recitation of the common noun (part), the method ends 276.

Any number of adjectives may be used to modify a common noun and define an element. The invention is meant to include any number of elements and any number of different adjectives, the exemplary elements include two or fewer modifying elements for clarity purposes.

The invention also includes a computer and a computer program system for preparing a patent application. The system includes an application memory for storing a patent application including a claims section, a description section, and an abstract section.

A first embodiment of the computer system includes a first element memory for storing 22 a first element designated by a common noun (part) preceded solely by a first primary adjective (red) and for storing 24 a first reference numeral (100) associated with the first element.

The first embodiment of the computer system also includes a second element memory for storing 26 a second element designated by the common noun (part) preceded solely by a second primary adjective (blue) and for storing 28 a second reference numeral (102) associated with the second element.

The computer system is characterized by a scanning processor for scanning 38 the application memory for each occurrence of the common noun (part).

The first embodiment of the computer system includes processors for inserting the proper reference numeral in response to each occurrence of a single element in the absence of the other elements throughout the claims section, the description section, and the abstract section of the patent application. The system includes a first element processor for automatically inserting 40 the first reference numeral (100) following the common noun (part) in response to the scanning processor detecting the occurrence of the common noun (part) preceded solely by the first primary adjective (red) 42. The system further includes a second element processor for automatically inserting 44 the second reference numeral (102) following the common noun (part) in response to the scanning processor detecting the occurrence of the common noun (part) preceded solely by the second primary adjective (blue) 46.

The first embodiment of the computer system includes a common noun processor for automatically inserting 72 the first (100) and second (102) reference numerals following the common noun (part) in response to the scanning processor detecting the occurrence of the common noun (part) unmodified by an adjective 74.

A second embodiment of the computer system includes a first element memory for storing 122 a first element designated by a common noun (part) preceded by a first primary adjective (red) and a first secondary adjective (top) and for storing 124 a first reference numeral (100) associated with the first element.

The second embodiment of the computer system also includes a second element memory for storing 126 a second element designated by the common noun (part) preceded by a second primary adjective (blue) and a second secondary adjective (bottom) and for storing 128 a second reference numeral (102) associated with the second element.

The second embodiment of the computer system also includes a third element memory for storing 130 a third element with the common noun (part) preceded by a third combination of adjectives including one of the primary adjectives (red, blue) identifying one of the first and second elements combined with the secondary adjective (top, bottom) identifying the other one of the first and second elements and for storing 132 a third reference numeral (104) associated with the third element.

The second embodiment of the computer system is characterized by a scanning processor for scanning 138 the application memory for each occurrence of the common noun (part).

The second embodiment of the computer system includes processors for inserting the proper reference numeral in response to each occurrence of a single element in the absence of the other elements. The system includes a first element processor for automatically inserting 140 the first reference numeral (100) following the common noun (part) in response to the scanning processor detecting the occurrence of the common noun (part) preceded by the first primary adjective (red) and the first secondary adjective (top) 142. The system further includes a second element processor for automatically inserting 144 the second reference numeral (102) following the common noun (part) in response to the scanning processor detecting the occurrence of the common noun (part) preceded by the second primary adjective (blue) and the second secondary adjective (bottom) 146. The system further includes a third element processor for automatically inserting 148 the third reference numeral (104) following the common noun (part) in response to the scanning processor detecting the occurrence of the common noun (part) preceded by the third combination of adjectives including one of the primary adjectives (red, blue) identifying one of the first and second elements combined with the secondary adjective identifying the other of the first and second elements 150.

The second embodiment of the computer system further includes processors for inserting more than one reference numeral when the common noun (part) is modified solely by a single adjective. The system includes a third element secondary adjective processor for automatically inserting the third reference numeral (104) and the one of the first (100) and second (102) reference numerals having the same secondary adjective as the third element in response to the scanning processor detecting the occurrence of the common noun (part) preceded solely by the secondary adjective of the third element. The system also includes a third element primary adjective processor for automatically inserting the third reference numeral (104) and the one of the first (100) and second (102) reference numerals having the same primary adjective as the third element in response to the scanning processor detecting the occurrence of the common noun (part) preceded solely by the primary adjective of the third element.

Finally, the second embodiment of the computer system includes a common noun processor for automatically inserting 172 the first (100), second (102) and third (104) reference numerals following the common noun (part) in response to the scanning processor detecting the occurrence of the common noun (part) unmodified by an adjective 174.

A third embodiment of the computer system includes a first element memory for storing 222 a first element designated by a common noun (part) preceded by a first primary adjective (red) and a first secondary adjective (top) and for storing 224 a first reference numeral (100) associated with the first element.

The third embodiment of the computer system also includes a second element memory for storing 226 a second element designated by the common noun (part) preceded by a second primary adjective (blue) and a second secondary adjective (bottom) and for storing 228 a second reference numeral (102) associated with the second element.

The third embodiment of the computer system also includes a third element memory for storing 230 a third element designated by the common noun (part) preceded by the first primary adjective (red) and a second secondary adjective (bottom) and for storing 232 a third element reference numeral (104) associated with the third element.

The third embodiment of the computer system also includes a fourth element memory for storing 234 a fourth element designated by the common noun (part) preceded by the second primary adjective (blue) and the first secondary adjective (bottom) and for storing 236 a fourth reference numeral (106) associated with the fourth element.

The computer system is characterized by a scanning processor for scanning the application memory for each occurrence of the common noun (part) processors for inserting the proper reference numeral(s) in response to each occurrence of the common noun.

The third embodiment of the computer system includes a first element processor for automatically inserting 240 the first reference numeral (100) following the common noun (part) in response to the scanning processor detecting the occurrence of the common noun (part) preceded by the first primary adjective (red) and the first secondary adjective (top) 242. The system further includes a second element processor for automatically inserting 244 the second reference numeral (102) following the common noun (part) in response to the scanning processor detecting the occurrence of the common noun (part) preceded by the second primary adjective (blue) and the second secondary adjective (bottom) 246. The system further includes a third element processor for automatically inserting 248 the third reference numeral (104) following the common noun (part) in response to the scanning processor detecting the occurrence of the common noun (part) preceded by the first primary adjective (red) and the second secondary adjective (bottom) 250. The system further includes a fourth element processor for automatically inserting 252 the fourth reference numeral (106) following the common noun (part) in response to the scanning processor detecting the occurrence of the common noun (part) preceded by the second primary adjective (blue) and the first secondary adjective (top) 254.

The third embodiment of the computer system further includes processors for inserting more than one reference numeral when a common noun (part) is modified by a single adjective. The system includes a first secondary adjective processor for automatically inserting 256 the first (100) and fourth (106) reference numerals following the common noun (part) in response to the scanning processor detecting the occurrence of the common noun (part) preceded solely by the first secondary adjective (top) 258. The system includes a second secondary adjective processor for automatically inserting 260 the second (102) and third (104) reference numerals following the common noun (part) in response to the scanning processor detecting the occurrence of the common noun (part) preceded solely by the second secondary adjective (bottom) 262. The system includes a first primary adjective processor for automatically inserting 264 the first (100) and third (104) reference numerals following the common noun (part) in response to the scanning processor detecting the occurrence of the common noun (part) preceded solely by the first primary adjective (red) 266. The system includes a second primary adjective processor for automatically inserting 268 the second (102) and fourth (106) reference numerals following the common noun (part) in response to the scanning processor detecting the occurrence of the common noun (part) preceded solely by the second primary adjective (blue) 270.

Finally, the third embodiment of the computer system includes a common noun processor for automatically inserting 272 the first (100), second (102), third (104) and fourth (106) reference numerals following the common noun (part) in response to the scanning processor detecting the occurrence of the common noun (part) unmodified by an adjective 274.

Obviously, many modifications and variations of the present invention are possible in light of the above teachings and may be practiced otherwise than as specifically described while within the scope of the appended claims. That which is prior art in the claims precedes the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

What is claimed is:

1. A method of preparing a patent application having a description section and a claims section and an abstract section by using a computer program comprising the steps of:
   manually highlighting elements in the patent application having a common noun;
   recognizing (22) a first element designated by the common noun preceded by a first primary adjective, associating (24) a first reference numeral with the common noun preceded by the first primary adjective to reference the first element, recognizing (26) a second element designated by the common noun preceded by a second primary adjective, associating (28) a second reference numeral with the common noun preceded by the second primary adjective to reference the second element, scanning (38) at least one section of the patent application for each occurrence of the common noun, automatically inserting (40) the first reference numeral following the common noun in response to each recitation of the common noun preceded by the first primary adjective (42) to reference the first element throughout said least one section of the patent application, automatically inserting (44) the second reference numeral following the common noun in response to each recitation of the common noun preceded by the second primary adjective (46) to reference the second element throughout said at least one section the patent application, and characterized by automatically inserting (72) the first and second reference numerals following the common noun in response to each recitation of the common noun unmodified by an adjective (74) to reference the first and second elements throughout said at least one section the patent application.

2. A method as set forth in claim 1 further comprising the steps of:

recognizing (122, 222) the first element designated by adding a first secondary adjective to the common noun preceded by the first primary adjective, recognizing (126, 226) the second element designated by adding a second secondary adjective to the common noun preceded by the second primary adjective, automatically inserting (140, 240) the first reference numeral following the common noun in response to each recitation of the common noun modified by the first primary adjective and the first secondary adjective (142, 242) to reference the first element throughout said at least one section the patent application, and automatically inserting (144, 244) the second reference numeral following the common noun in response to each recitation of the common noun modified by the second primary adjective and the second secondary adjective to reference second element throughout said at least one section the patent application (146, 246).

3. A method as set forth in claim 2 further comprising the steps of:

recognizing (130, 230) a third element designated by the common noun preceded by a third combination of adjectives including one of the primary adjectives identifying one of the first and second elements combined with the secondary adjective identifying the other one of the first and second elements, associating (132, 232) a third reference numeral with the common noun preceded by the third combination of adjectives, automatically inserting (148, 248) the third reference numeral following the common noun in response to each recitation of the common noun preceded solely by the third combination of adjectives (150, 250) to reference the third element throughout said at least one section of the patent application, further characterized by automatically inserting (166, 264) the first and third reference numerals following the common noun in response to each recitation of the common noun modified solely by the one of the primary and secondary adjective shared between the first and third elements (166, 266) and automatically inserting (160, 260) the second and third reference numerals following the common noun in response to each recitation of the common noun modified solely by the one of the primary and secondary adjectives shared between the second and third elements (162, 262), and automatically inserting (172) the first reference numeral and the second reference numeral and the third reference numeral following the common noun in response to each recitation of the common noun unmodified by an adjective (174) to reference the first element and the second element and the third element throughout said at least one section of the patent application.

4. A method as set forth in claim 3 further comprising the steps of:

recognizing a fourth element (234) designated by the common noun preceded by a fourth combination including the other primary adjective from the primary adjective of the third combination combined with the other secondary adjective from the secondary adjective of the third combination, associating (236) a fourth reference numeral with the common noun preceded by the fourth combination of adjectives to reference the fourth element, automatically (252) inserting the fourth reference numeral following the common noun in response to each recitation of the common noun preceded by the fourth combination of adjectives (254) to reference the fourth element throughout said at least one section the patent application, further characterized by automatically inserting (256) the first and fourth reference numerals following the common noun in response to each recitation of the common noun modified solely by the one of the primary and secondary adjective shared between the first and fourth elements (258) and automatically inserting (268) the second and fourth reference numerals following the common noun in response to each recitation of the common noun modified solely by the one of the primary and secondary adjectives shared between the second and fourth reference numerals (270), and automatically inserting (272) the first reference numeral and the second reference numeral and the third reference numeral and the fourth reference numeral following the common noun in response to each recitation of the common noun unmodified by an adjective (274) to reference the first element and the second element and the third element and the fourth element throughout said at least one section the patent application.

5. A method of preparing a patent application having a description section and a claims section and an abstract section by using a computer program comprising the steps of:

manually highlighting elements in the patent application having a common noun;

recognizing (22, 122, 222) a first element designated by the common noun preceded by a first primary adjective and a first secondary adjective, associating (24, 124, 224) a first reference numeral with the common noun preceded by the first primary adjective and the first secondary adjective to reference the first element, recognizing (26, 126, 226) a second element designated by a common noun preceded by a second primary adjective and a second secondary adjective, associating (28, 128, 228) a second reference numeral with the common noun preceded by the second primary adjective and the second secondary adjective to reference the second element, recognizing (130, 230) a third element manually designated by the common noun preceded by the first primary adjective and the second secondary adjective associating (132, 232) a third reference numeral with the common noun preceded by the first primary adjective and the second secondary adjective, recognizing (234) a fourth element designated by the common noun preceded by the second primary adjective and the first secondary adjective, associating (236) a fourth reference numeral with the common noun preceded by the second primary adjective and the first secondary adjective to reference the fourth element, scanning (38, 138, 238) the claims section and the description section and the abstract section for each occurrence of the common noun, automatically inserting (40, 140, 240) the first reference numeral following the common noun in response to each recitation of the common noun preceded by the first primary adjective and the first secondary adjective (42, 142, 242) throughout the claims section and the description section and the abstract section of the patent application to reference the first element, automatically inserting (44, 144, 244) the second reference numeral following the common noun in response to each recitation of the common noun preceded by the second primary adjective and the second secondary adjective (46, 146, 246) throughout the claims section and the description section and the abstract section of the patent application to reference the second element, automatically inserting (148, 248) the third reference numeral following the common noun in response to each recitation of the common noun preceded by the first primary adjective and the second secondary adjective (150, 250) throughout the claims section and the description section and the abstract section of the patent application to reference the third element, automatically inserting (252) the fourth reference numeral following the common noun in response to each recitation of the common noun preceded by the second primary adjective and the first secondary adjective (254) throughout the claims section and the description section and the abstract section of the patent application to reference the fourth element, characterized by automatically inserting (256) the first and fourth reference numerals following the common noun in response to each recitation of the common noun modified solely by the first secondary adjective (258) throughout the claims section and the description section and the abstract section of the patent application to reference the first and fourth elements, automatically inserting (160, 260) the second and third reference numerals following the common noun in response to each recitation of the common noun modified solely by the second secondary adjective (162, 262) throughout the claims section and the description section and the abstract section of the patent application to reference the second and third elements, automatically inserting (164, 264) the first and third reference numerals following the common noun in response to each recitation of the common noun modified solely by the first primary adjective (166, 266) throughout the claims section and the description section and the abstract section of the patent application to reference the first and third elements, automatically inserting (268) the second and fourth reference numerals following the common noun in response to each recitation of the common noun modified solely by the second primary adjective (270) throughout the claims section and the description section and the abstract section of the patent application to reference the second and fourth elements, and automatically inserting (172, 272) the first reference numeral and the second reference numeral and the third reference numeral and the fourth reference numeral following the common noun in response to each recitation of the common noun unmodified by an adjective (174, 274) throughout the claims section and the description section and the abstract section of the patent application to reference the first element and the second element and the third element and the fourth element.

6. A computer program and a computer for preparing a patent application in conjunction with a word processing program comprising:

an application memory for storing at least one section of the patent application and manually highlighted elements in the patent application having a common noun, a first element memory for storing (22) a first element designated by the common noun preceded by a first primary adjective and for storing (24) a first reference numeral, a second element memory for storing (26) a second element designated by the common noun preceded by a second primary adjective and for storing (28) a second reference numeral, a scanning processor for scanning (38) said application memory for each occurrence of said common noun, a first element processor for automatically inserting (40) said first reference numeral following said common noun in response to said scanning processor detecting said occurrence of said common noun preceded by said first primary adjective (42), a second element processor for automatically inserting (44) said second reference numeral following said common noun in response to said scanning processor detecting said occurrence of said common noun preceded by said second primary adjective (46), and characterized by a common noun processor for automatically inserting (72) said first and second reference numerals following said common noun in response to said scanning processor detecting said occurrence of said common noun unmodified by an adjective (74).

7. A computer program and a computer for preparing a patent application in conjunction with a word processing program as set forth in claim 6 further including:

said first element of said first element memory is further defined by including a first secondary adjective (122, 222), said second element of said second element memory is further defined by including a second secondary adjective (126, 226), said first element processor is further defined by automatically inserting (140, 240) said first reference numeral following said common noun in response to said scanning processor detecting said common noun preceded by said first primary adjective and said first secondary adjective (142, 242), said second element processor is further defined by automatically inserting (144, 244) the second reference numeral following said common noun in response to said scanning processor detecting said common noun preceded by said second primary adjective and said second secondary adjective (146, 246), a third element memory for storing (130, 230) a third element manually designated by the common noun preceded by a third combination of adjectives including one of the primary adjectives identifying one of the first and second elements combined with the secondary adjective identifying the other one of the first and second elements and for storing (132, 232) a third reference numeral, and a third element processor for automatically inserting (148, 248) said third reference numeral following said common noun in response to said scanning processor detecting said common noun preceded by said third combination of adjectives (150, 250).

8. A computer program and a computer for preparing a patent application in conjunction with a word processing program as set forth in claim 7 further including:

a third element primary adjective processor for automatically inserting said third reference numeral and the one of said first and second reference numerals having the same primary adjective as said third element in response to said scanning processor detecting said common noun preceded solely by said primary adjective of the third element, and a third element secondary adjective processor for automatically inserting said third reference numeral and the one of said first and second reference numerals having the same secondary adjective as said third element in response to said scanning processor detecting said common noun preceded solely by said secondary adjective of the third element.

9. A computer program and a computer for preparing a patent application in conjunction with a word processing program comprising:

an application memory for storing at least one section of the patent application and manually highlighted elements in the patent application having a common noun, said at least one section of a patent application including a claims section and a description section and an abstract section, a first element memory for storing (22, 122, 222) a first element designated by the common noun preceded by a first primary adjective and a first secondary adjective and for storing (24, 124, 224) a first reference numeral, a second element memory for storing (26, 126, 226) a second element designated by said common noun preceded by a second primary adjective and a second secondary adjective and for storing (28, 128, 228) a second reference numeral, a third element memory for storing (130, 230) a third element designated by said common noun preceded by said first primary adjective and a second secondary adjective and for storing (132, 232) a third element reference numeral, a fourth element memory for storing (234) a fourth element designated by said common noun preceded by said second primary adjective and said first secondary adjective and for storing (236) a fourth reference numeral, characterized by a scanning processor for scanning (38, 138, 238) said application memory for each occurrence of said common noun, a first element processor for automatically inserting (40, 140, 240) said first reference numeral following said common noun in response to said scanning processor detecting said occurrence of said common noun preceded by said first primary adjective and said first secondary adjective (42, 142, 242), a second element processor for automatically inserting (44, 144, 244) said second reference numeral following said common noun in response to said scanning processor detecting said occurrence of said common noun preceded by said second primary adjective and said second secondary adjective (46, 146, 246), a third element processor for automatically inserting (148, 248) said third reference numeral following said common noun in response to said scanning processor detecting said occurrence of said common noun preceded by said first primary adjective and said second secondary adjective (150, 250), a fourth element processor for automatically inserting (252) said fourth reference numeral following said common noun in response to said scanning processor detecting said occurrence of said common noun preceded by said second primary adjective and said first secondary adjective (254), a first secondary adjective processor for automatically inserting (256) said first and fourth reference numerals following said common noun in response to said scanning processor detecting said occurrence of said common noun preceded solely by said first secondary adjective (258), a second secondary adjective processor for automatically inserting (160, 260) said second and third reference numerals following said common noun in response to said scanning processor detecting said occurrence of said common noun preceded solely by said second secondary adjective (162, 262), a first primary adjective processor for automatically inserting (164, 264) said first and third reference numerals following said common noun in response to said scanning processor detecting said occurrence of said common noun preceded solely by said first primary adjective (166, 266), a second primary adjective processor for automatically inserting (268) said second and fourth reference numerals following said common noun in response to said scanning processor detecting said occurrence of said common noun preceded solely by said second primary adjective (270), and a common noun processor for automatically inserting (272) said first reference numeral and said second reference numeral and said third reference numeral and said fourth reference numeral following said common noun in response to said scanning processor detecting said occurrence of said common noun unmodified by an adjective (274).

* * * * *